(12) United States Patent
Johnson (10) Patent No.: US 8,984,987 B2
(45) Date of Patent: Mar. 24, 2015

(54) ADAPTOR FOR TURN SIGNAL LEVER

(71) Applicant: Wesley C. Johnson, Columbia, PA (US)

(72) Inventor: Wesley C. Johnson, Columbia, PA (US)

( * ) Notice: Subject to any disclaimer, the term of this patent is extended or adjusted under 35 U.S.C. 154(b) by 0 days.

(21) Appl. No.: 14/107,655

(22) Filed: Dec. 16, 2013

(65) Prior Publication Data

US 2014/0245858 A1   Sep. 4, 2014

Related U.S. Application Data

(60) Provisional application No. 61/771,357, filed on Mar. 1, 2013.

(51) Int. Cl.
  *G05G 1/00* (2008.04)
  *B60Q 1/26* (2006.01)
  *G05G 1/04* (2006.01)
  *B60K 37/06* (2006.01)

(52) U.S. Cl.
  CPC . *G05G 1/04* (2013.01); *B60K 37/06* (2013.01)
  USPC .................................. 74/544; 74/548; 116/36

(58) Field of Classification Search
  CPC ....... B60K 20/02; G05G 1/04; F16H 59/0217
  USPC ....... 74/484 R, 519, 523, 525, 543, 544, 548, 74/551.8, 551.9, 557; 116/35 A, 35 R, 36, 116/46, 51, 56; D12/174, 177; 16/421, 422, 16/426, 427, 429, 430, DIG. 24, DIG. 25; 403/362; 248/218.4, 219.1–219.4, 248/220.21, 220.22, 221.11, 248/222.12–222.14, 223.31, 316.1
  See application file for complete search history.

(56) References Cited

U.S. PATENT DOCUMENTS 2,185,024 A * 12/1939 Eddy .............................. 74/543
2,592,413 A *  4/1952 Garfield ......................... 74/557
4,677,932 A    7/1987 Ewing
6,872,027 B2 *  3/2005 Ledingham ................... 403/400

OTHER PUBLICATIONS

Extension Control Right Hand Turn Signal Lever Extension (Model 3543) from www.abledata.com.*

* cited by examiner

*Primary Examiner* — Thomas R Hannon
*Assistant Examiner* — Adam D Rogers
(74) *Attorney, Agent, or Firm* — McNees Wallace & Nurick LLC (57) ABSTRACT

A turn signal adaptor for use with a turn signal lever of a vehicle. The turn signal adaptor includes a mounting member and a crossover signal arm. The crossover signal arm extends from the mounting end at the right side of a steering column of a steering wheel of the vehicle to the free end at the left side of the steering column. At least one height adjustment screw allows leveling of the mounting member and the crossover signal arm relative to the turn signal lever such that the crossover signal arm extends across the steering column of the vehicle while creating no or minimal visibility issues with the driver seeing an instrument cluster panel of the vehicle, allowing a user to activate the turn signal lever with the use of the right hand, without taking hands off the steering wheel.

16 Claims, 6 Drawing Sheets

ADAPTOR FOR TURN SIGNAL LEVER

FIELD OF THE INVENTION

This invention relates to a turn signal adaptor for individuals with an impaired physical condition. In particular, the invention is directed to a turn signal adaptor that converts a left-handed vertically actuated turn signal control lever into a right-handed turn signal control without inhibiting actuation of the rotational accessory controls mounted in the left-handed turn signal lever.

BACKGROUND OF THE INVENTION

In many automobiles, the turn signal controls consist of a turn signal lever extending radially from the steering column. The lever is vertically actuated in order to control the left hand and right hand turn signal lights. However, for individuals with an impaired physical condition which does not allow use of their left arm, such as amputees or individuals who have suffered a stroke, it is not possible to operate a lever that requires left hand engagement. Therefore, such an impaired driver cannot operate the left-handed turn signal lever on a conventional automobile.

In order to make the left-handed turn signal lever control accessible to the right hand of a driver, a prior art device was devised that included a vertically oriented arm extending upward from the left-handed turn signal lever. One end of the arm was positioned proximate a portion of the steering wheel such that the right hand of the driver could steer the vehicle and actuate the turn signal lever via the vertical arm. The other end of the vertical arm terminated in a block having a hole therein through which extended the lever. To attach the prior art turn signal bar to the turn signal lever of the automobile, all the radially extensive mechanisms on the turn signal lever had to be removed such that the block could be slipped over the extensive end of the turn signal lever. A set screw extended into the hole of the block and frictionally engaged the lever to fix the vertical arm onto the turn signal lever.

However, when automobile manufacturers added additional controls for other accessories onto the extensive end of the turn signal lever, removal of those controls was not possible and the prior art turn signal became inoperable. These accessory controls include wiper controls which rotate about the longitudinal axis of the turn signal lever. The rotational movement from the wiper control knob is carried by a control rod to a complementary mechanism in the steering column. The prior art turn signal bar would not permit use of this accessory control notwithstanding the inability of the block of the bar to fit over the accessory control knob.

It would, therefore, be beneficial to provide a turn signal adaptor which addresses the problems of ease of use and installation, thereby allowing such individuals to retain their ability to obtain driving privileges and the associated freedom. It would also be beneficial to provide an adaptor which does not interfere with a non impaired individual from operating the vehicle normally.

SUMMARY OF THE INVENTION

An object of the invention is to provide an adaptor for use with a turn signal lever of a vehicle, such that individuals with impaired use of their left arm or hand, such as stroke victims or amputees, may retain their ability to maintain or obtain driving privileges.

It is an object of the invention to provide a mounting bracket which mounts on to the turn signal lever, the mounting bracket having mounting adjustments which allow the leveling of the mounting bracket relative to the turn signal lever.

It is an object of the invention to provide an adaptor with a mounting device that may be adjusted to mount on turn signal levers of various diameters.

It is an object of the invention to provide an adaptor which does not interfere with the steering wheel and viewing the instrument cluster of the vehicle.

It is an object of the invention to provide an adaptor which enables a user to activate the turn signal indicators with his or her right hand while maintaining the right hand on the steering wheel.

It is an object of the invention to provide an adaptor, which when installed on the turn signal lever does not interfere with a non handicapped individual from operating the vehicle normally.

It is an object of the invention to provide an adaptor which is easily removable for placement on different vehicles and which does not damage the original turn signal lever.

An embodiment is directed to a turn signal adaptor for converting a left-handed vertically actuated turn signal lever of a vehicle into a right-handed turn signal control without inhibiting actuation of the rotational accessory controls mounted on the turn signal lever. The turn signal adaptor includes a mounting member and a crossover signal arm. The mounting member includes: at least one mounting screw for securing the mounting member to the turn signal lever; at least one height adjustment screw extending through a portion of the mounting member, the height adjustment screw cooperating with the turn signal lever; and an arm receiving opening for receiving a crossover signal arm therein. The crossover signal arm has a mounting end and a free end, the mounting end mounted in the arm receiving opening. The crossover signal arm extends from the mounting end at the right side of a steering column of a steering wheel of the vehicle to the free end at the left side of the steering column. The at least one height adjustment screw allows leveling of the mounting member and the crossover signal arm relative to the turn signal lever such that the crossover signal arm extends across the steering column of the vehicle while creating no or minimal visibility issues with the driver seeing an instrument cluster panel of the vehicle, allowing a user to activate the turn signal lever with the use of the right hand, without taking hands off the steering wheel.

An embodiment is directed to a turn signal adaptor for use with a turn signal lever of a vehicle. The turn signal adaptor includes a mounting member and a crossover signal arm. The mounting member mounts on to the turn signal lever. The crossover arm extends from the mounting member to the opposite side of a steering column on which the turn signal lever is mounted. The mounting member has at least one mounting adjustment and at least one height adjustment member which allow the mounting bracket to be fixedly mounted to the turn signal lever at various positions along the length of the turn signal lever. The at least one height adjustment member allows leveling of the mounting member and the crossover signal arm relative to the turn signal lever such that the crossover signal arm extends across the steering column of the vehicle while creating no or minimal visibility issues with the driver seeing an instrument cluster panel of the vehicle, thereby allowing a user to activate the turn signal lever with the use of the right hand, without taking hands off a steering wheel of the vehicle.

An embodiment is directed to a turn signal adaptor for use with a turn signal lever of a vehicle. The turn signal adaptor includes a mounting member and a crossover signal arm. The mounting member has: at least one mounting screw for securing the mounting member to the turn signal lever; at least one height adjustment screw, the height adjustment screw cooperating with the turn signal lever; an arm receiving opening for receiving a crossover signal arm therein; and a load transfer plate, the load transfer plate having a first opening for receiving the mounting screw therethrough. The crossover signal arm has a mounting end and a free end, the mounting end being mounted to the arm receiving opening. The crossover signal arm extends from the mounting end at the right side of a steering column of a steering wheel of the vehicle to the free end at the left side of the steering column. The at least one height adjustment screw allows leveling of the mounting member and the crossover signal arm relative to the turn signal lever such that the crossover signal arm extends across the steering column of the vehicle while creating no or minimal visibility issues with the driver seeing an instrument cluster panel of the vehicle.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The present invention will be described more fully hereinafter with reference to the accompanying drawings, in which illustrative embodiments of the invention are shown. The drawings are to be considered part of the entire written description. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the description of embodiments of the invention disclosed herein, any reference to direction or orientation is merely intended for convenience of description and is not intended in any way to limit the scope of the present invention. It will be understood that spatially relative terms, such as "top", "upper", "lower", "vertical" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "over" other elements or features would then be oriented "under" the other elements or features. Thus, the exemplary term "over" can encompass both an orientation of over and under. The device may be otherwise oriented (rotated 90 degrees or at other orientations) and the spatially relative descriptors used herein interpreted accordingly.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the illustrative embodiments. Accordingly, the invention expressly should not be limited to such embodiments illustrating some possible non-limiting combination of features that may exist alone or in other combinations of features; the scope of the invention being defined by the claims appended hereto.

The invention is directed to an adaptor for individuals with an impaired physical condition. The adaptor converts a left-handed vertically actuated lever into a right-handed control without inhibiting actuation of the rotational accessory controls mounted on the left-handed lever. In particular, the invention is directed to a turn signal adaptor for individuals with an impaired physical condition. The turn signal adaptor converts a left-handed vertically actuated turn signal control lever into a right-handed turn signal control without inhibiting actuation of the rotational accessory controls mounted on the left-handed turn signal lever.

Figure 1:
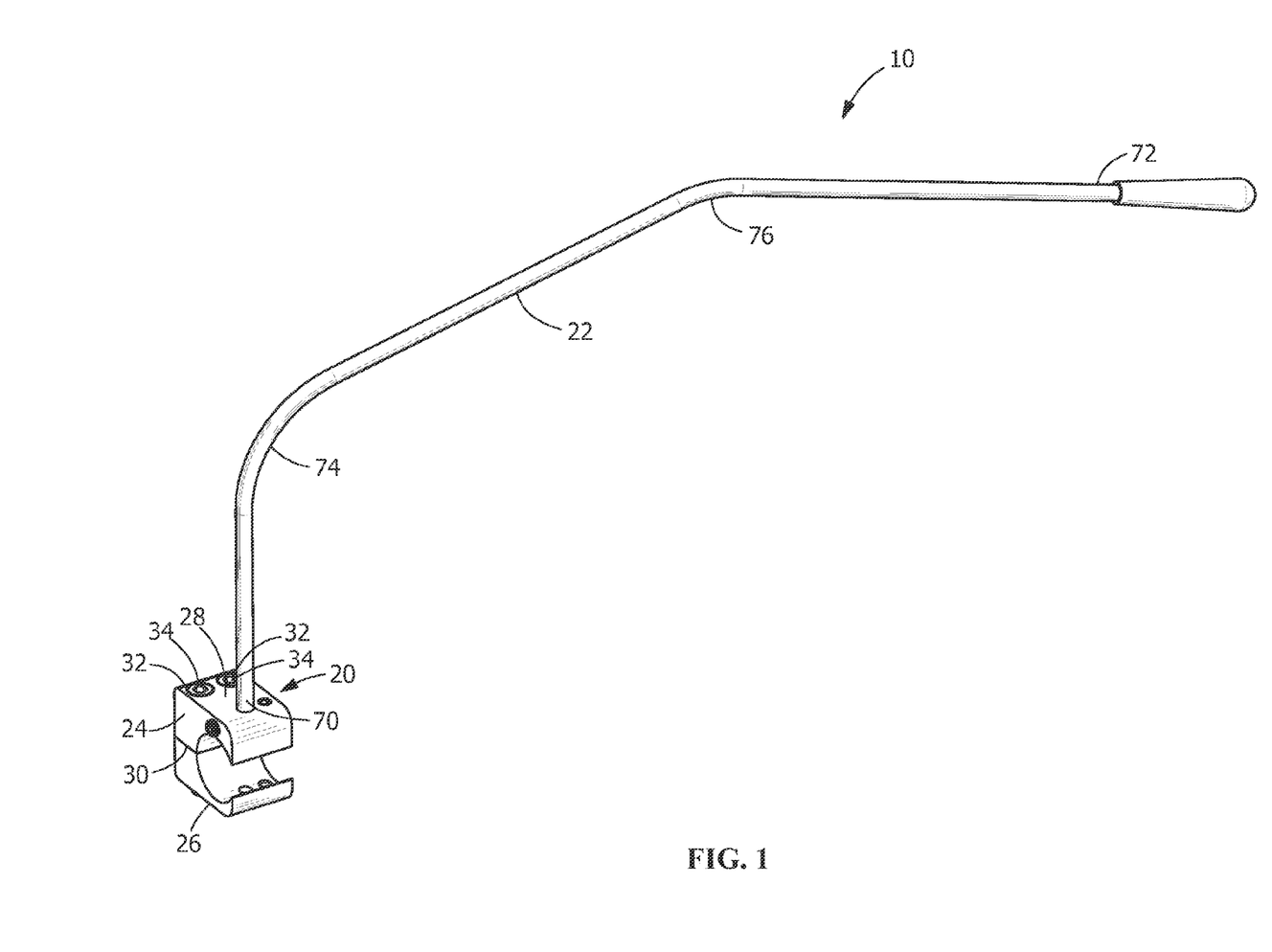
FIG. 1 illustrates a perspective view of an illustrative embodiment of a turn signal adaptor according to the present invention.
Figure 2:
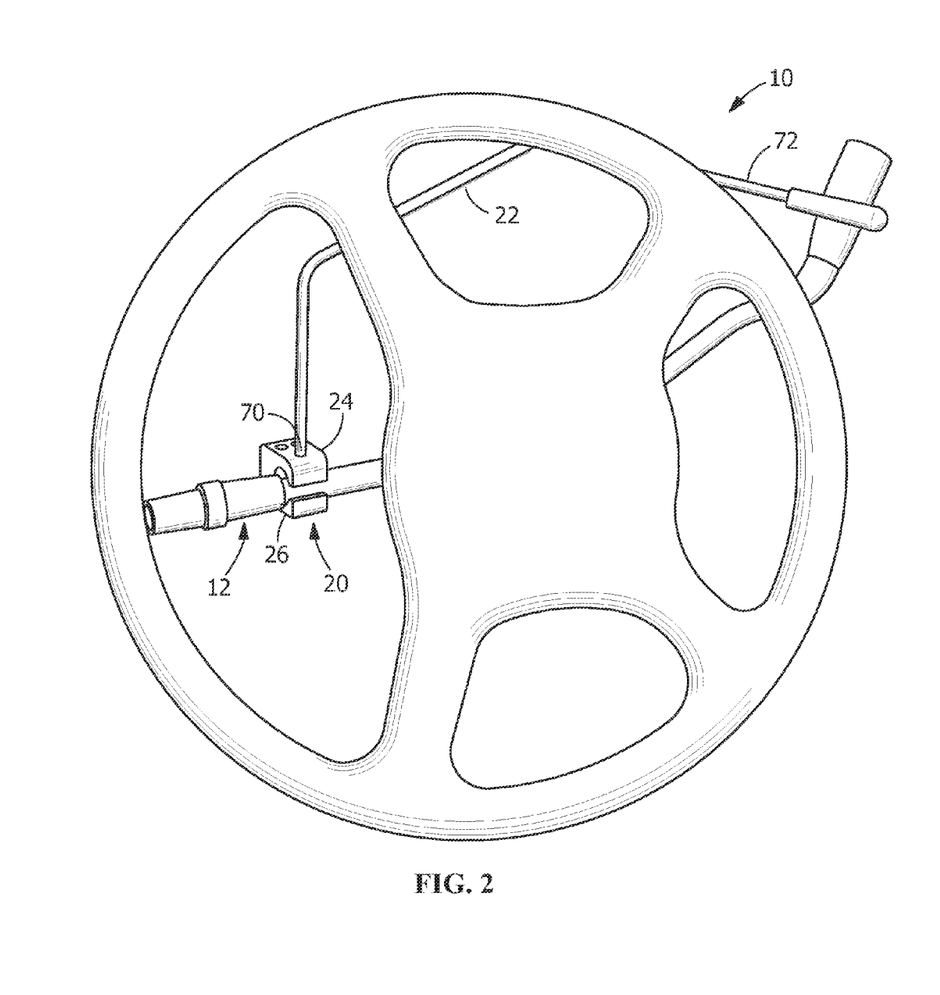
FIG. 2 illustrates a front view of a steering wheel, steering column and the turn signal adaptor of FIG. 1 attached to the turn signal lever.
Figure 3:
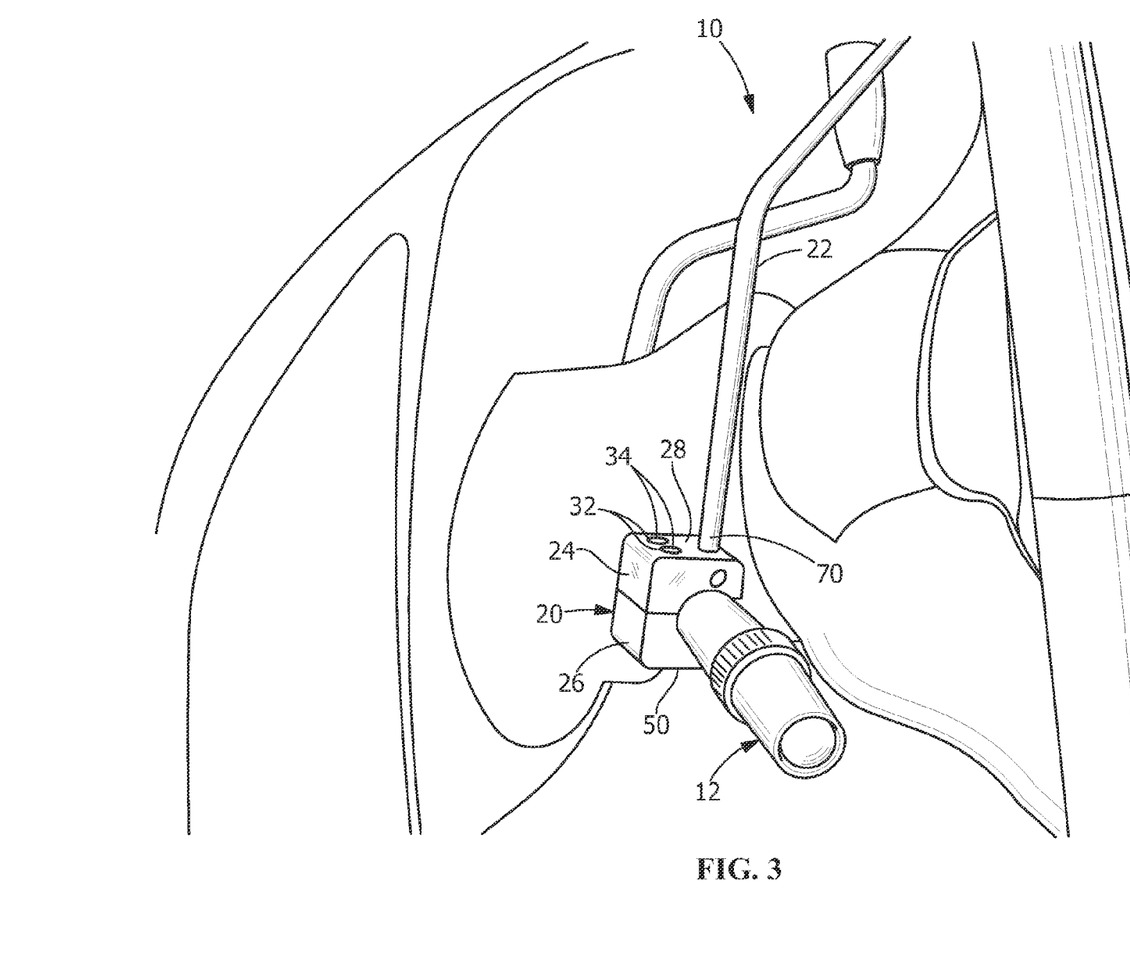
FIG. 3 illustrates the side view of the wheel, steering column and turn signal adaptor as shown in FIG. 2.

As shown in FIGS. 2 and 3, the turn signal adaptor 10 is attached to a turn signal lever 12. The turn signal adaptor 10 shown in FIGS. 1 through 5 is a universal turn signal adaptor 10 which can be mounted on turn signal levers 12 of many different makes of vehicles, including, but not limited to, GM and Ford vehicles. In general, the turn signal adaptor 10 enables a user to operate the turn signal lever 12 of a vehicle with his or her right hand. The turn signal adaptor 10 can be attached to the turn signal lever 12 at any location that will not interfere with any other controls that are on the turn signal lever 12, such as cruise control, wiper, and headlight controls.

Figure 4:
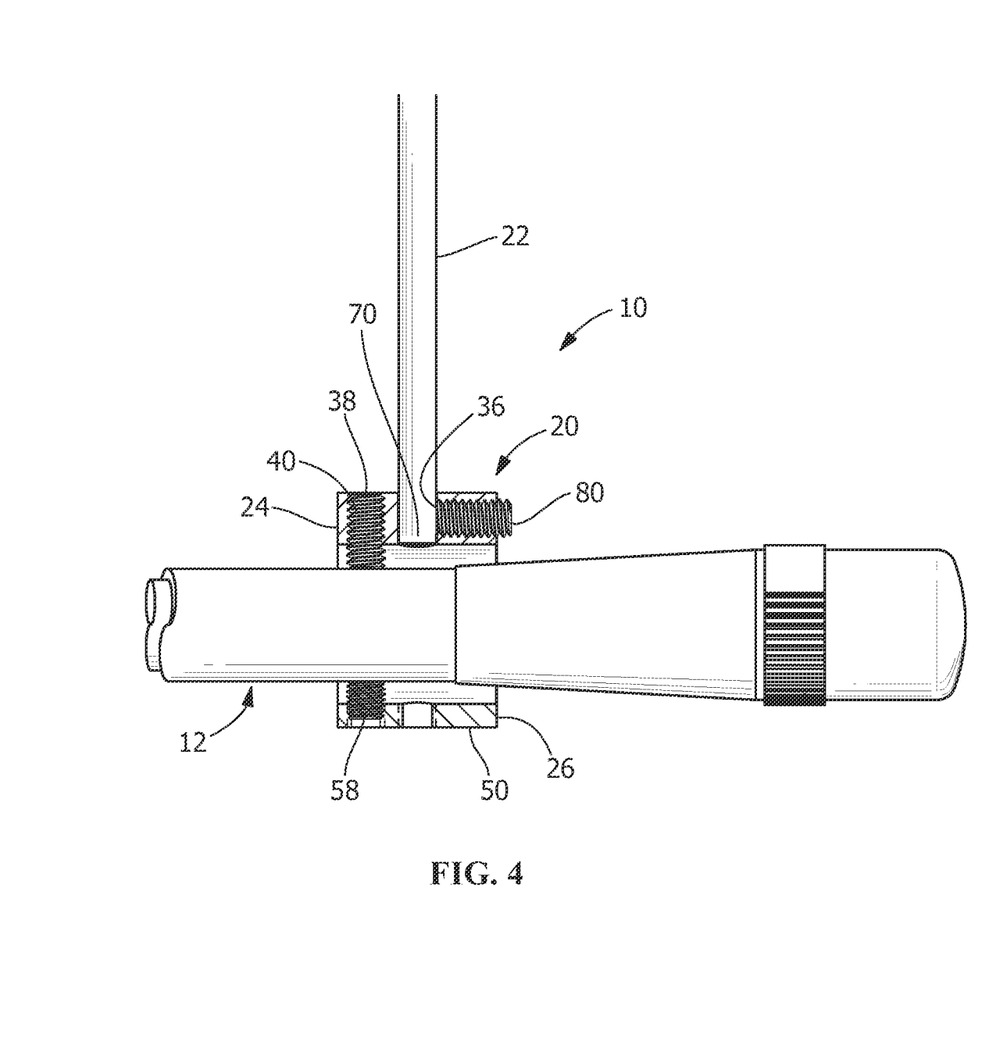
FIG. 4 is a cross-sectional view taken along line 4-4 in FIG. 3, illustrating a mounting member of the turn signal adaptor of FIG. 1 in engagement with the turn signal lever.
Figure 5:
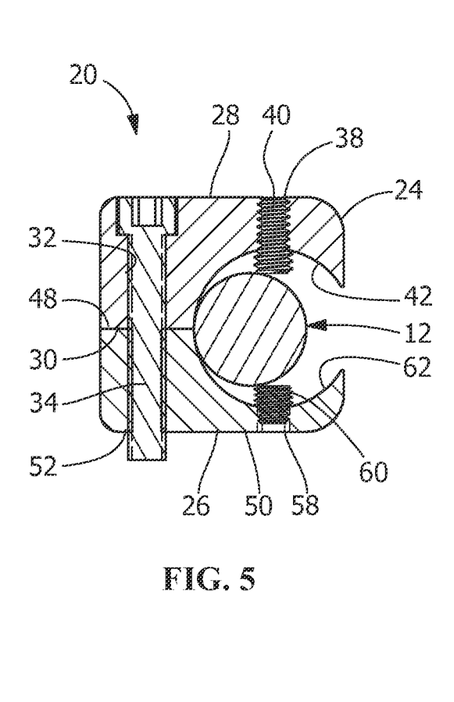
FIG. 5 is a cross-sectional view of the mounting member of the turn signal taken along line 5-5 of FIG. 4.

As best shown in FIGS. 1, 4 and 5, the turn signal adaptor 10 includes a mounting member or bracket 20 and crossover signal arm 22. The mounting member 20 has an upper bracket 24 and a lower bracket 26.

The upper bracket 24 has an upper surface 28 and a lower surface 30. Two openings 32 for receiving mounting screws 34 extend through the upper surface 28 and the lower surface 30. As best shown in FIG. 4, an opening 36 for receiving the crossover signal arm 22 extends through the upper surface 28. As best shown in FIG. 5, an opening 38 for receiving a set screw or height adjustment screw 40 extends from the upper surface 28 to an arcuate portion 42 of the lower surface 30. The height adjustment screw 40 is accessible in the opening 38 through the upper surface 28 to facilitate leveling the mounting member 20 on the turn signal lever 12. The arcuate portion 42 of the lower surface 30 is configured to accommodate the turn signal lever 12, as will be more fully described.

The lower bracket 26 has an upper surface 48 and a lower surface 50. Two openings 52 (FIG. 4) for receiving mounting screws 34 extend through the upper surface 48 and the lower surface 50. As best shown in FIG. 5, two openings 58 for receiving bottom mounting screws 60 extend from the lower surface 50 to an arcuate portion 62 of the upper surface 48. The arcuate portion 62 of the upper surface 48 is configured to accommodate the turn signal lever 12, as will be more fully described.

The upper bracket 24 and lower bracket 26 can be manufactured from any type of light metal or plastic composite, including, but not limited to, machined aluminum. The upper bracket 24 and lower bracket 26 combine to form the two piece clam shell mounting member 20 which allows the mounting member 20 to be mounted on various diameter turn signal levers 12, such as, but not limited to turn signal levers 12 with a diameter from approximately ½ inch to approximately 1⅝ inches.

The crossover signal arm 22 can be constructed of any light weight material having the necessary strength and rigidity characteristics, such as, but not limited to, aluminum, milled steel or stainless steel. For proper operation of the crossover signal arm 22, the material used must be able to limit deflection when the crossover signal arm 22 is engaged. In the embodiment shown in FIGS. 2 and 3, the crossover signal arm 22 has a mounting end 70 and a free end 72. The mounting end 70 is mounted to the opening 36 of the upper bracket 24 of the mounting member 20. In the embodiment shown, the crossover signal arm 22 is maintained in position by a set screw 80 (FIG. 4) which extends through an opening 82 in the upper bracket 24 to engage and maintain the crossover signal arm 22 in the opening 36. Alternatively, mounting threads may be provided on the mounting end 70 which cooperate with complimentary threads of the opening 36, however, other methods of mounting the crossover signal arm 22 to the mounting member 20 may be used. The crossover signal arm 22 has a first bend 74 which is bent approximately 60 degrees, approximately 4 inches from the fixed end 70, and a second bend 76 which is bent approximately 30 degrees, approximately 11 inches from the fixed end 70. This allows the crossover signal arm 22 to extend across the steering column of the vehicle while creating no or minimal visibility issues with the driver seeing the instrument cluster panel or dashboard. In the embodiment shown, the crossover signal arm 22 extends from the mounting end 70 at the left side of the steering column to the free end 72 at the right side of the steering wheel at approximately the 2 o'clock position. This enables a user to activate the turn signal lever 12 and the turn signal with the use of the right hand, without taking hands off the steering wheel.

While the dimensions and configurations are shown and described for the embodiment shown, other dimensions and configurations of the crossover signal arm 22 can be used without departing from the scope of the invention. Depending upon the particular configuration of the crossover signal arm 22, the diameter of the crossover signal arm 22 and the mounting opening 36 may vary to provide sufficient stability for the crossover signal arm 22.

In order to install the mounting member 20 on the turn signal lever 12, the mounting screws 34 which extend through the mounting openings 32 of the upper bracket 24 and into the mounting openings 52 of the lower bracket 26 are loosened to allow the upper bracket 24 and lower bracket 26 to separate. This allows the arcuate portion 42 of the upper bracket 24 to move away from the arcuate portion 62 of the lower bracket 26. The mounting screws 34 are loosened until the opening provided between the arcuate portions 42, 62 is large enough to accommodate the turn signal lever 12 there between.

With the mounting screws 34 loosened, the mounting member 20 is inserted onto the turn signal lever 12. The mounting member 20 is positioned at a location which does not interfere with other controls that are positioned on the turn signal lever 12.

If the turn signal lever 12 is not tapered and the turn signal lever 12 is properly positioned between the arcuate portions 42, 62, the mounting screws are tightened, capturing turn signal lever 12 between the arcuate portions 42, 62. The height adjustment screw 40 and the bottom mounting screws 60 are also tightened to eliminate movement of the mounting member 20 relative to the turn signal lever 12, thereby mounting the mounting member 20 and the turn signal adaptor 10 to the turn signal lever 12.

Depending on the particular turn signal lever 12 and particular steering wheel alignment, it may be necessary to rotate the mounting member 20 and the turn signal adaptor 10 after the mounting member 20 has been positioned on the turn signal lever 12. Rotations of approximately 5 to 10 degrees may be necessary to allow the crossover signal arm 22 to clear the steering wheel.

If the turn signal lever 12 is tapered and the turn signal lever 12 is properly positioned between the arcuate portions 42, 62, the following procedure is followed to mount the turn signal adaptor 10 on to the tapered shaft of the turn signal lever 12. The outside (left as viewed in FIG. 4) mounting screw 34 is tightened until the screw 34 is tight and the mounting member 20 is snugly maintained on the turn signal lever 12. The other mounting screw 34 may be partially tightened, such that the other mounting screw 34 is not fully tightened, allowing a portion of the mounting member 20 to move in a direction which is essentially perpendicular to the longitudinal axis of the turn signal lever 12. This causes the mounting member 20 and the turn signal adaptor 10 to be tilted toward the steering column.

The height adjustment screw 40 is then tightened causing the height adjustment screw 40 to engage the turn signal lever 12. As the tightening of the height adjustment screw 40 is continued, a portion of the mounting member 20 is moved essentially perpendicular to the longitudinal axis of the turn signal lever 12, moving the crossover signal arm 22 to extend in the proper position across the steering column of the vehicle while creating no or minimal visibility issues with the driver seeing the instrument cluster panel or dashboard, as previously discussed.

The other mounting screw 34 and the bottom mounting screws 60 are the tightened to eliminate movement of the mounting member 20 relative to the turn signal lever 12, thereby mounting the mounting member 20 and the turn signal adaptor 10 to the turn signal lever 12.

The crossover signal arm 22 may be installed in the opening 36 (FIG. 4) prior to or after installation of the mounting member 20 on the turn signal lever 12.

The positioning of the mounting member 20 along the longitudinal axis of the turn signal lever 12 can be adjusted for proper operation. The mounting member 20 is positioned such that the activation of the free end 72 of the crossover signal arm 22 allows for the proper operation of the turn signal lever 12. In the illustrative embodiment, the turn signal adaptor 10 is properly installed when the crossover signal arm 22 and the turn signal lever 12 can be activated by applying pressure on the crossover signal arm 22 with the index or middle finger at approximately the second joint (tip of finger). It is important to note that mounting of the mounting member 20 and the turn signal adaptor 10 on the turn signal lever 12 will vary depending upon the model of the vehicle and other environmental factors. Proper positioning of the mounting member 20 allows the turn signal lever 12 and the turn signals operated thereby to perform as designed. However, if after activating the right signal, the turn signal adaptor 10 and the turn signal lever 12 return past center to activate the left turn signal, the mounting member 20 must be moved closer to the steering column. Conversely, if the crossover signal arm 22 and the turn signal lever 12 require significant force to operate, the mounting member 20 must be moved further from the steering column. When performing such adjustments, the screws must be loosened to allow the mounting member 20 to be moved. Once properly positioned, the screws are tightened as described above. Such adjustment is performed as necessary.

Figure 6:
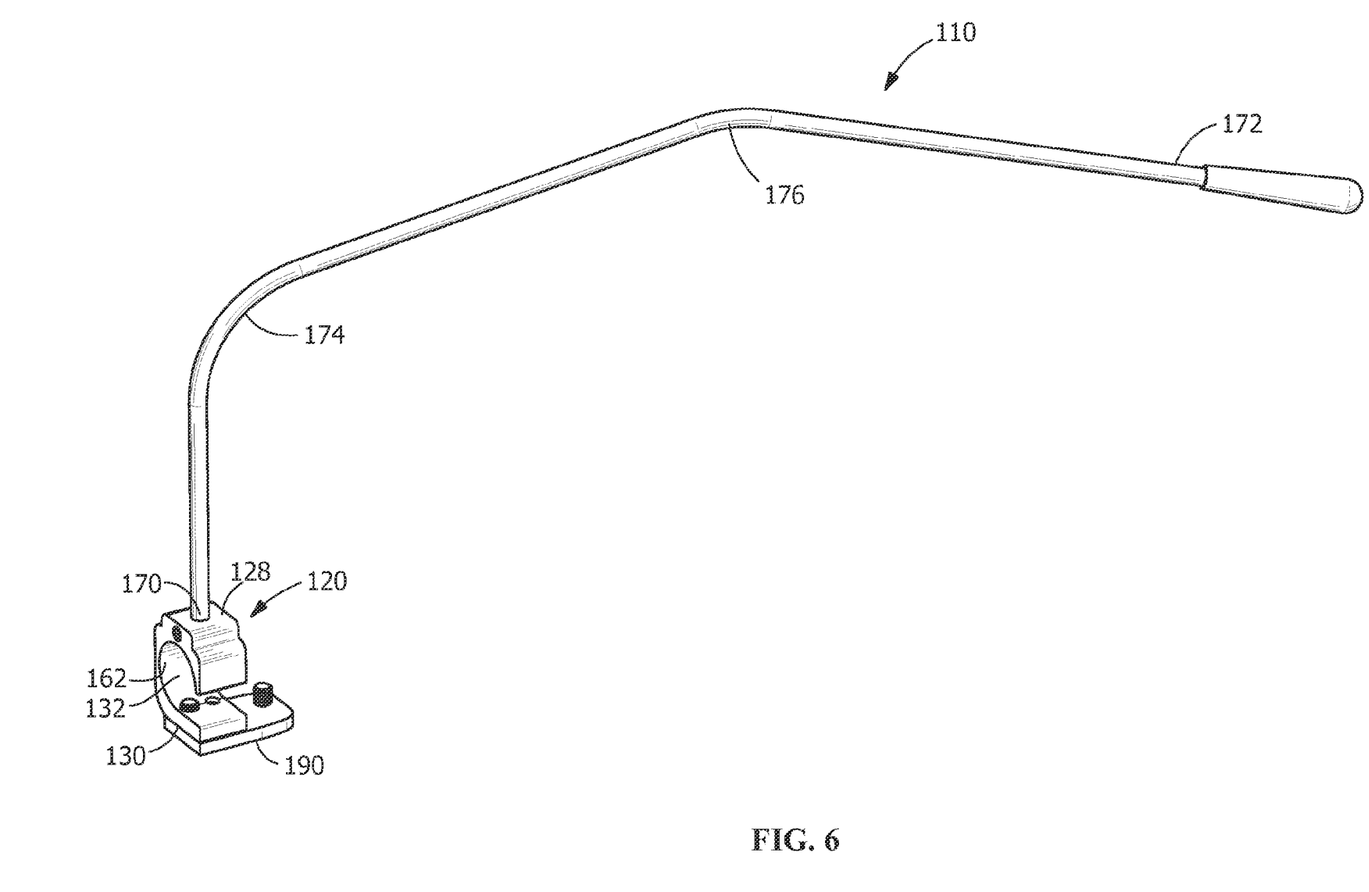
FIG. 6 illustrates a perspective view of an alternate illustrative embodiment of a turn signal adaptor according to the present invention.
Figure 7:
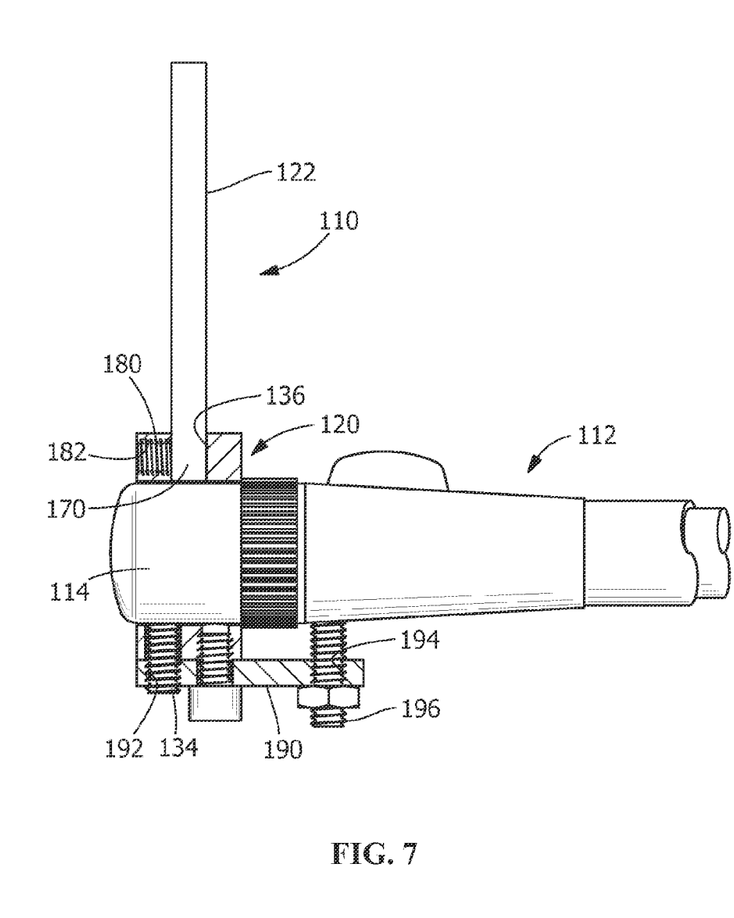
FIG. 7 is a cross-sectional view illustrating a mounting member of the turn signal adaptor of FIG. 6 in engagement with the turn signal lever.
Figure 8:
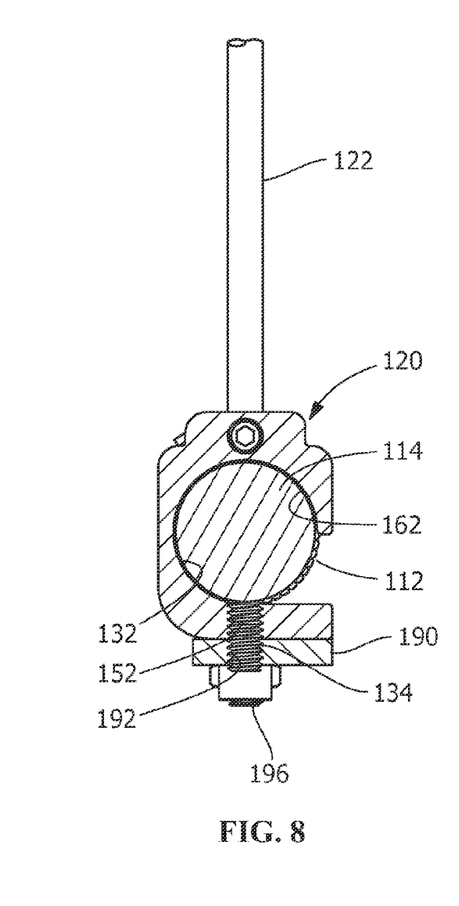
FIG. 8 is a cross-sectional view of the mounting member of the turn signal taken along line 8-8 of FIG. 7.

Referring to FIGS. 6 through 8, an alternative embodiment of the turn signal adaptor 110 is shown. The turn signal adaptor 110 includes a mounting member or bracket 120 and crossover signal arm 122.

The mounting member 120 has an upper surface 128 and a lower surface 130. The mounting member has a C-shaped opening 132 which is dimensioned to receive an end 114 of the turn signal lever 112. An opening 136 for receiving the crossover signal arm 122 extends through the upper surface 128. The lower surface 130 has an opening 152 for receiving a mounting screw 134 therethrough. The opening 152 extends to an arcuate portion 162 of the opening 132. The arcuate portion 162 is configured to accommodate the turn signal lever 112.

A load transfer or stabilization plate 190 is provided proximate the lower surface 130 of the mounting member 120. The stabilization plate 190 has an opening 192 for receiving the mounting screw 134 therethrough. The stabilization plate 190 also has an opening 194 for receiving a set screw or height adjustment screw 196 therethrough. The opening 194 is spaced from the opening 192 in the direction of the longitudinal axis of the turn signal lever 112.

The mounting member 120 and plate 190 can be manufactured from any type of light metal or plastic composite, including, but not limited to, machined aluminum. The mounting member 120 may be mounted on various diameter turn signal levers 112.

The crossover signal arm 122 can be constructed of any light weight material having the necessary strength and rigidity characteristics, such as, but not limited to, aluminum, milled steel or stainless steel. For proper operation of the crossover signal arm 122, the material used must be able to be to limit deflection when the crossover signal arm 122 is engaged. In the embodiment shown in FIGS. 2 and 3, the crossover signal arm 122 has a mounting end 170 and a free end 172. The mounting end 170 is mounted to the opening 136 (FIG. 7) of the mounting member 120. In the embodiment shown, the crossover signal arm 122 is maintained in position by a set screw 180 which extends through an opening 182 in mounting member 120 to engage and maintain the crossover signal arm 122 in the opening 136. Alternatively, mounting threads may be provided on the mounting end 170 which cooperate with complimentary threads of the opening 136, however, other methods of mounting the crossover signal arm 122 to the mounting member 120 may be used. The crossover signal arm 122 has a first bend 174 which is bent approximately 60 degrees, approximately 4 inches from the fixed end 170, and a second bend 176 which is bent approximately 30 degrees, approximately 11 inches from the fixed end 170. This allows the crossover signal arm 122 to extend across the steering column of the vehicle while creating no or minimal visibility issues with the driver seeing the instrument cluster panel or dashboard. In the embodiment shown, the crossover signal arm 122 extends from the mounting end 170 at the left side of the steering column to free end 172 at the right side of the steering wheel at approximately the 2 o'clock position. This enables a user to activate the turn signal lever 112 and the turn signal with the use of the right hand, without taking hands off the steering wheel.

While the dimensions and configurations are shown and described for the embodiment shown, other dimensions and configurations of the crossover signal arm 122 can be used without departing from the scope of the invention. Depending upon the particular configuration of the crossover signal arm 122, the diameter of the crossover signal arm 122 and the mounting opening 136 may vary to provide sufficient stability for the crossover signal arm 122.

In order to install the mounting member 120 on the turn signal lever 112, the opening 132 is aligned with the end 114 of the turn signal lever 112. The mounting member 120 is then moved onto the end 114 of the turn signal lever 112. The mounting member 120 is positioned so the mounting member 120 does not interfere with the cruise control lever or other such devices if so equipped. With the mounting member 120 properly positioned, the outer mounting screw 134 is tightened. The mounting member 120 may or may not need to be rotated forward of center to allow for proper installation.

The crossover signal arm 122 may be installed in the opening 136 prior to or after installation of the mounting member 120 on the turn signal lever 112. The crossover signal arm 122 can be adjusted until crossover signal arm 122 can be activated by applying pressure on the crossover signal arm 122 as described above. Once adjusted, the set screw 180 is tightened to maintain the crossover signal arm 122 in the proper position. The plate set screw 196 is then tightened, thereby securing the mounting member 120 and the turn signal adaptor 110 to the turn signal lever 112.

As the turn signal adaptor 10, 110 can be used with many different turn signal levers 12, it may be necessary to shorten the crossover signal arm 22 so as not to interrupt the operation of the shifter or other operations of the vehicle. For example, if the crossover signal arm 22 protrudes out past the steering wheel, the free end 72, 172 of the crossover signal arm 22 may be cut to the appropriate length and an end cap inserted over the cut end.

The crossover signal arm 22 includes multiple bends that are necessary to insure that the right hand signal arm does not interfere with the steering wheel and viewing the instrument cluster. This enables a user to activate the turn signal lever 12 with his or her right hand, thereby preventing the user from having to take his or her right hand off of the steering wheel to engage the turn signal.

The turn signal adaptor 10, 110 is beneficial for disabled people who do not have use of their left arm or hand, such as stroke victims or amputees, so that they may retain their ability to obtain driving privileges and the freedom that comes with that. The turn signal adaptor 10, 110 is easily operated by using the index or middle finger while the hand remains on the steering wheel.

Additionally, the installation of the turn signal adaptor 10, 110 does not interfere with a non disabled individual's operation of the vehicle. The turn signal adaptor 10, 110 is easily removable for placement on different vehicles and does not damage the original turn signal lever 12.

While the invention has been described with reference to a preferred embodiment, it will be understood by those skilled in the art that various changes may be made and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A turn signal adaptor for converting a left-handed vertically actuated turn signal lever of a vehicle into a right-handed turn signal control without inhibiting actuation of rotational accessory controls mounted on the turn signal lever, the turn signal adaptor comprising:
   a mounting member comprising:
   an upper bracket and a lower bracket;
   at least one mounting screw for securing the mounting member to the turn signal lever;
   at least one height adjustment screw extending through a portion of the mounting member, the at least one height adjustment screw cooperating with the turn signal lever;
   an arm receiving opening for receiving a crossover signal arm therein;
   the crossover signal arm having a mounting end and a free end, the mounting end being mounted to the arm receiving opening, the crossover signal arm extending from the mounting end at the left side of a steering column of a steering wheel of the vehicle to the free end at the right side of the steering column;
   wherein the at least one height adjustment screw allows leveling of the mounting member and the crossover signal arm relative to the turn signal lever such that the crossover signal arm extends across the steering column of the vehicle while creating no visibility issues with a driver seeing an instrument cluster panel of the vehicle, allowing the driver to activate the turn signal lever with the use of their right hand, without taking their hands off the steering wheel.

2. The turn signal adaptor as recited in claim 1, wherein the turn signal adaptor is a universal turn signal adaptor which can be mounted on turn signal levers of many different makes of vehicles at any location of on the turn signal lever that will not interfere with other controls that are on the turn signal lever.

3. The turn signal adaptor as recited in claim 2, wherein the arm receiving opening extends through an upper surface of the upper bracket, the at least one height adjustment screw extends from the upper surface of the upper bracket to an arcuate portion of a lower surface of the upper bracket, the arcuate portion of the lower surface is configured to accommodate the turn signal lever.

4. The turn signal adaptor as recited in claim 3, wherein the at least one mounting screw extends from a lower surface of the lower bracket to an arcuate portion of an upper surface of the lower bracket, the arcuate portion of the lower bracket is configured to accommodate the turn signal lever.

5. The turn signal adaptor as recited in claim 4, wherein at least one bracket retaining screw extends through the upper bracket and lower bracket to secure the upper bracket to the lower bracket.

6. The turn signal adaptor as recited in claim 1, wherein the mounting end of the crossover signal arm is retained in the arm receiving opening by a set screw.

7. The turn signal adaptor as recited in claim 1, wherein the mounting member has an upper surface and a lower surface, a C-shaped opening extends through the mounting member and is dimensioned to receive an end of the turn signal lever.

8. The turn signal adaptor as recited in claim 7, wherein the arm receiving opening extends through the upper surface, the at least one mounting screw extends through the lower surface to the C-shaped opening.

9. The turn signal adaptor as recited in claim 8, wherein a load transfer plate is provided proximate the lower surface of the mounting member, the load transfer plate has a first opening for receiving the at least one mounting screw therethrough.

10. The turn signal adaptor as recited in claim 9, wherein the load transfer plate has a second opening for receiving the at least one mounting screw therethrough, the first opening is spaced from the second opening in a direction of a longitudinal axis of the turn signal lever.

11. A turn signal adaptor for use with a turn signal lever of a vehicle, the turn signal adaptor comprising: a mounting member which mounts on to the turn signal lever and a crossover signal arm which extends from the mounting member to the opposite side of a steering column on which the turn signal lever is mounted, the mounting member having an upper bracket and a lower bracket, the mounting member having at least one mounting adjustment and at least one height adjustment member which allow a mounting bracket to be fixedly mounted to the turn signal lever at various positions along a length of the turn signal lever, wherein the at least one height adjustment member allows leveling of the mounting member and the crossover signal arm relative to the turn signal lever such that the crossover signal arm extends across the steering column of the vehicle while creating no visibility issues with a driver seeing an instrument cluster panel of the vehicle, allowing the driver to activate the turn signal lever with the use of their right hand, without taking their hands off a steering wheel of the vehicle.

12. The turn signal adaptor as recited in claim 11, wherein the turn signal adaptor is a universal turn signal adaptor which can be mounted on turn signal levers of many different makes of vehicles at any location of the turn signal lever that will not interfere with other controls that are on the turn signal lever.

13. The turn signal adaptor as recited in claim 11, wherein the mounting member has an arm receiving opening for receiving the crossover signal arm extends through an upper surface of the upper bracket, the at least one height adjustment screw extends from the upper surface of the upper bracket to an arcuate portion of a lower surface of the upper bracket, the arcuate portion of the lower surface is configured to accommodate the turn signal lever.

14. The turn signal adaptor as recited in claim 13, wherein at least one mounting screw extends from a lower surface of the lower bracket to an arcuate portion of an upper surface of the lower bracket, the arcuate portion of the lower bracket is configured to accommodate the turn signal lever.

15. The turn signal adaptor as recited in claim 14, wherein at least one bracket retaining screw extends through the upper bracket and lower bracket to secure the upper bracket to the lower bracket.

16. The turn signal adaptor as recited in claim 13, wherein a mounting end of the crossover signal arm is retained in the arm receiving opening by a set screw.

* * * * *